(12) United States Patent
Tanaka et al.

(10) Patent No.: US 12,113,166 B2
(45) Date of Patent: Oct. 8, 2024

(54) BATTERY

(71) Applicant: Panasonic Intellectual Property Management Co., Ltd., Osaka (JP)

(72) Inventors: Yoshiaki Tanaka, Kyoto (JP); Izuru Sasaki, Aichi (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 536 days.

(21) Appl. No.: 17/546,134

(22) Filed: Dec. 9, 2021

(65) Prior Publication Data
US 2022/0102753 A1 Mar. 31, 2022

Related U.S. Application Data

(63) Continuation of application No. PCT/JP2020/011720, filed on Mar. 17, 2020.

(30) Foreign Application Priority Data

Jul. 4, 2019 (JP) .................................. 2019-125554

(51) Int. Cl.
H01M 10/0562 (2010.01)
H01M 4/131 (2010.01)
(Continued)

(52) U.S. Cl.
CPC ....... *H01M 10/0562* (2013.01); *H01M 4/131* (2013.01); *H01M 4/134* (2013.01);
(Continued)

(58) Field of Classification Search
CPC ....... H01M 10/0562; H01M 2300/008; H01M 2300/0065; H01M 2300/0071
See application file for complete search history.

(56) References Cited

U.S. PATENT DOCUMENTS

2020/0144575 A1* 5/2020 Ku .................. H01M 4/587
2022/0102755 A1* 3/2022 Miyatake ............ H01M 4/13
(Continued)

FOREIGN PATENT DOCUMENTS

CN 116845344 A * 10/2023
JP 2006-244734 9/2006
(Continued)

OTHER PUBLICATIONS

The Indian OA dated Jul. 26, 2023 for the related Indian Patent Application No. 202147058875.
(Continued)

*Primary Examiner* — Amanda C. Walke
(74) *Attorney, Agent, or Firm* — GREENBLUM & BERNSTEIN, P.L.C.

(57) ABSTRACT

A battery is equipped with a positive electrode, a first electrolyte layer, a second electrolyte layer, and a negative electrode arranged in this order, in which the first electrolyte layer contains a first solid electrolyte material, the second electrolyte layer contains a second solid electrolyte material different from the first solid electrolyte material, the first solid electrolyte material is represented by chemical formula (1): $Li_\alpha M_\beta O_\gamma V_\delta$ where $\alpha$, $\beta$, $\gamma$, and $\delta$ are all greater than 0, M is at least one element selected from the group consisting of metal elements other than Li, and metalloids, X is at least one element selected from the group consisting of Cl, Br, and I, and a reduction potential of the second solid electrolyte material is lower than a reduction potential of the first solid electrolyte material.

11 Claims, 3 Drawing Sheets

(51) Int. Cl.
*H01M 4/134* (2010.01)
*H01M 4/62* (2006.01)
*H01M 10/052* (2010.01)

(52) U.S. Cl.
CPC ......... *H01M 4/621* (2013.01); *H01M 10/052* (2013.01); *H01M 2300/0065* (2013.01); *H01M 2300/0071* (2013.01); *H01M 2300/008* (2013.01)

(56) References Cited

U.S. PATENT DOCUMENTS

| | | | | |
|---|---|---|---|---|
| 2022/0209287 A1* | 6/2022 | Tanaka | ................ | H01M 10/052 |
| 2022/0246983 A1* | 8/2022 | Suzuki | ................ | H01M 10/052 |
| 2022/0393242 A1* | 12/2022 | Han | .................. | H01M 10/0569 |
| 2023/0042911 A1* | 2/2023 | Sasaki | .................... | H01M 4/36 |
| 2023/0106765 A1* | 4/2023 | Takeuchi | ............. | C01G 35/006 |
| | | | | 429/323 |
| 2023/0268550 A1* | 8/2023 | Tanaka | .................... | H01B 1/08 |
| | | | | 429/323 |
| 2023/0307704 A1* | 9/2023 | Tanaka | .............. | H01M 10/0562 |
| 2024/0047680 A1* | 2/2024 | Miyamoto | ............. | H01M 4/36 |
| 2024/0145704 A1* | 5/2024 | Miyamoto | ............ | H01M 4/366 |
| 2024/0178383 A1* | 5/2024 | Sagara | ................. | H01M 4/485 |

FOREIGN PATENT DOCUMENTS

| | | |
|---|---|---|
| JP | 2009-277383 A | 11/2009 |
| WO | 2015/079509 A1 | 6/2015 |

OTHER PUBLICATIONS

Tetsuya Asano; Akihiro Sakai; Satoru Ouchi; Masashi Sakaida; Akinobu Miyazaki; Shinya Hasegawa: "Solid Halide Electrolytes with High Lithium-ion Conductivity for Application in 4 V Class Bulk-Type All-Solid-State Batteries". Advanced Materials, vol. 30, No. 44, Sep. 14, 2018, pp. 1-7, XP055721991, DE, ISSN: 0935-9648, DOI: https://doi.org/10.1002/adma.201803075.

International Search Report of PCT application No. PCT/JP2020/011720 dated Jun. 23, 2020.

Fudong Han et al., "Electrochemical Stability of Li10GeP2S12 and Li7La3Zr2O12 Solid Electrolytes", Advanced Energy Materials, Jan. 21, 2016, 1501590.

* cited by examiner

BATTERY

BACKGROUND

1. Technical Field

The present disclosure relates to a battery.

2. Description of the Related Art

Japanese Unexamined Patent Application Publication No. 2006-244734 discloses an all-solid battery that uses a halide solid electrolyte.

SUMMARY

One non-limiting and exemplary embodiment provides a battery having a high discharge capacity.

In one general aspect, the techniques disclosed here feature a battery equipped with a positive electrode, a first electrolyte layer, a second electrolyte layer, and a negative electrode arranged in this order, in which the first electrolyte layer contains a first solid electrolyte material, the second electrolyte layer contains a second solid electrolyte material different from the first solid electrolyte material, the first solid electrolyte material is represented by chemical formula (1): $Li_\alpha M_\beta O_\gamma X_\delta$ where $\alpha$, $\beta$, $\gamma$, and $\delta$ are all greater than 0, M is at least one element selected from the group consisting of metal elements other than Li, and metalloids, X is at least one element selected from the group consisting of Cl, Br, and I, and a reduction potential of the second solid electrolyte material is lower than a reduction potential of the first solid electrolyte material.

According to the present disclosure, the discharge capacity of a battery can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, embodiments of the present disclosure are described with reference to the drawings.

First Embodiment

Figure 1:
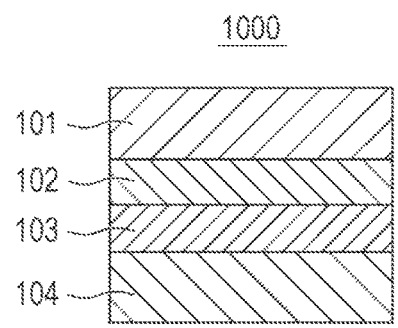
FIG. 1 is a cross-sectional view of a battery 1000 according to a first embodiment.
Figure 2:
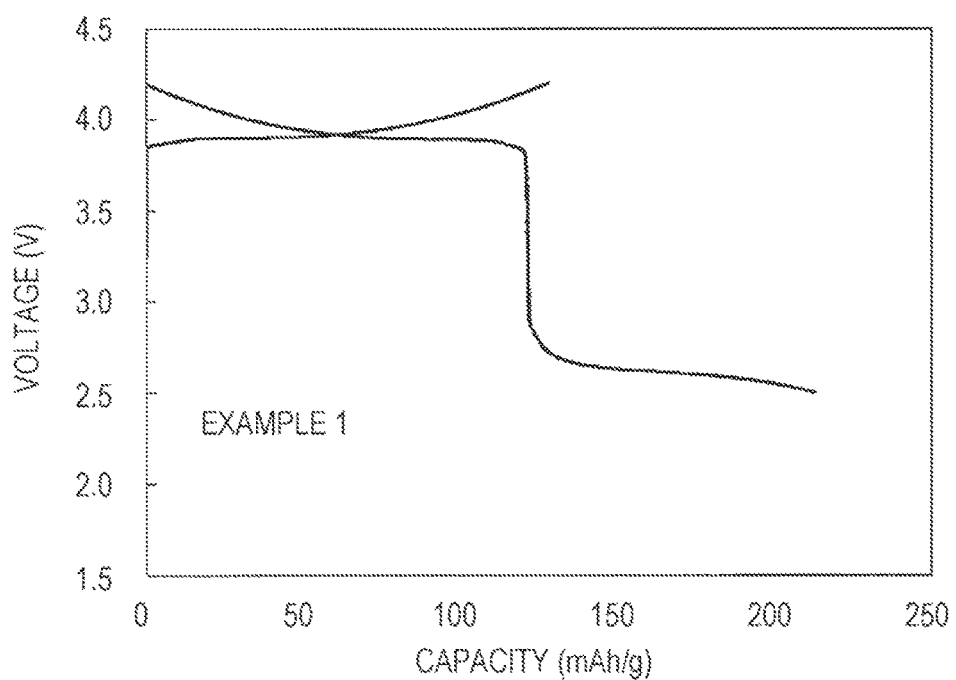
FIG. 2 is a graph illustrating charge/discharge characteristics of a secondary battery of Example 1.
Figure 3:
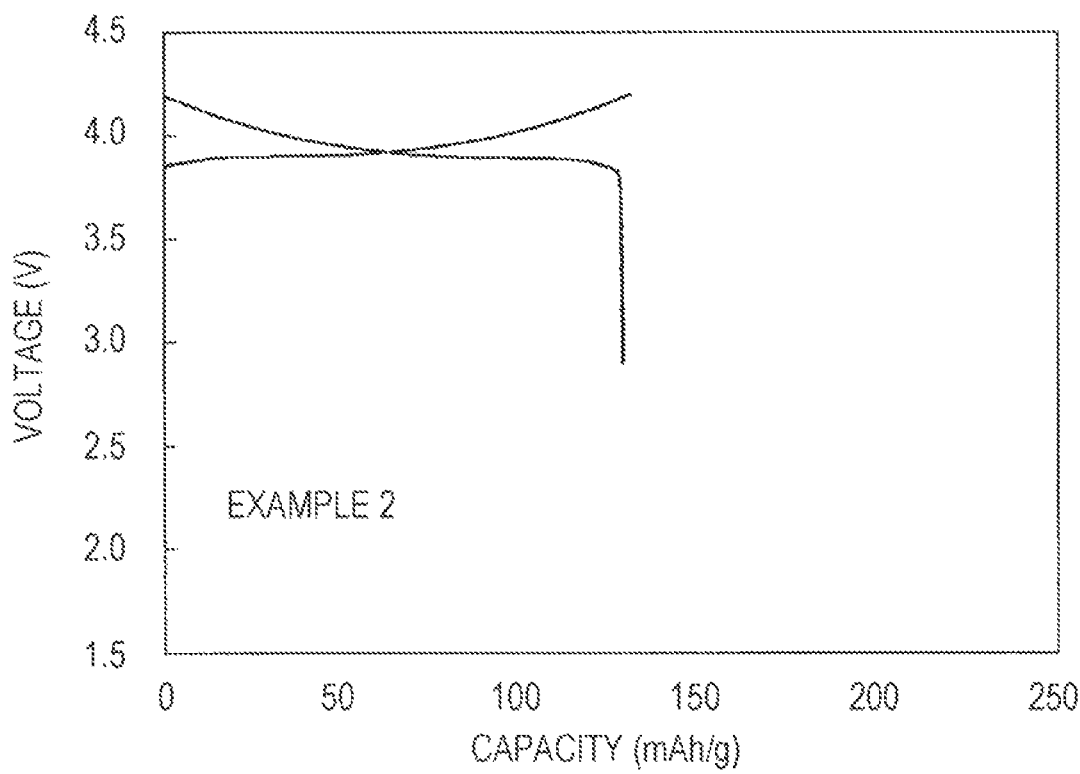
FIG. 3 is a graph illustrating charge/discharge characteristics of a secondary battery of Example 2.
Figure 4:
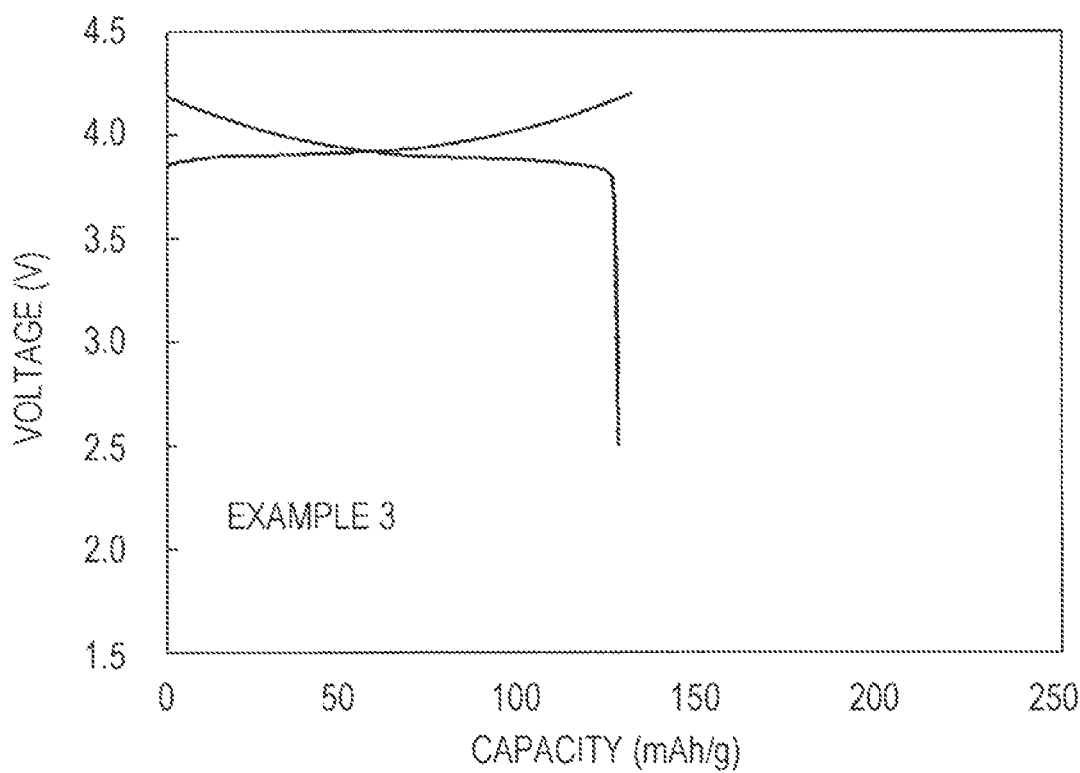
FIG. 4 is a graph illustrating charge/discharge characteristics of a secondary battery of Example 3.
Figure 5:
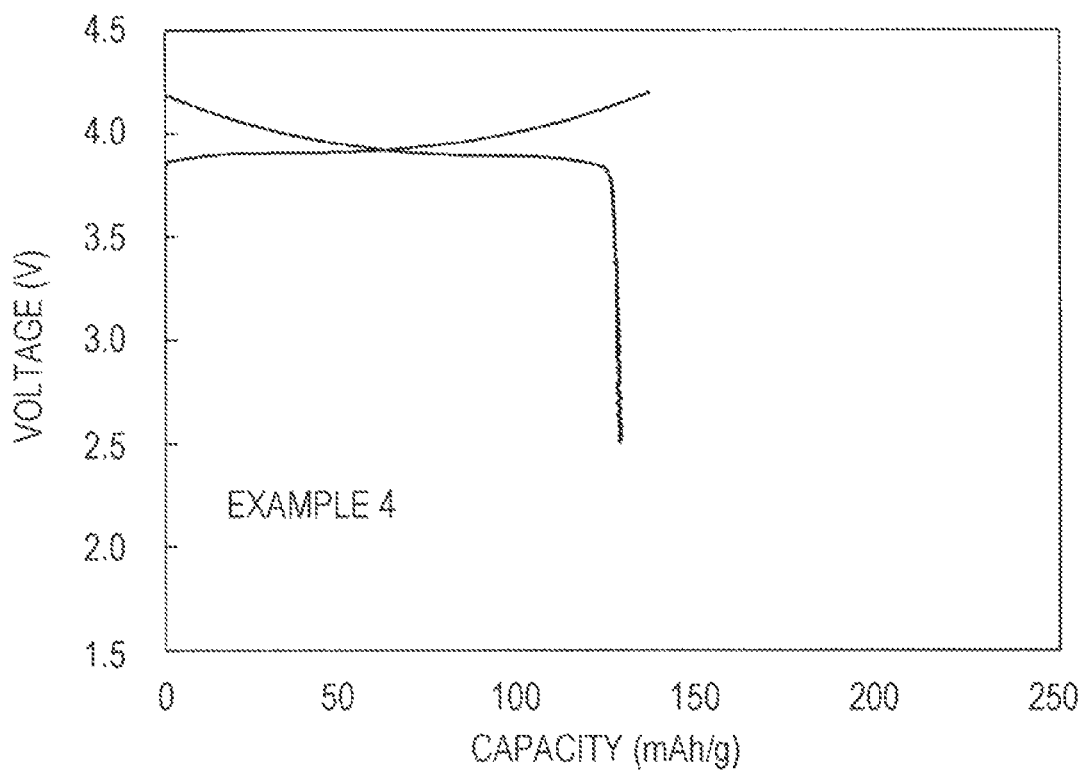
FIG. 5 is a graph illustrating charge/discharge characteristics of a secondary battery of Example 4.
Figure 6:
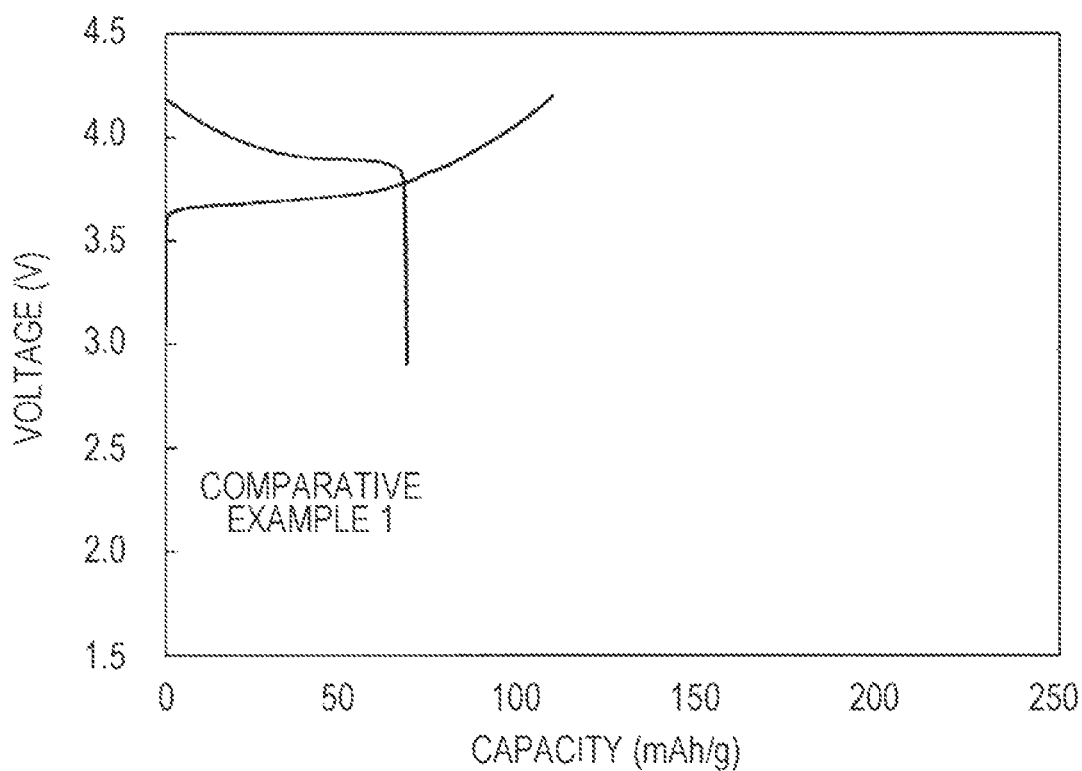
FIG. 6 is a graph illustrating charge/discharge characteristics of a secondary battery of Comparative Example 1.

FIG. 1 is a cross-sectional view illustrating a schematic structure of a battery 1000 according to a first embodiment.

The battery 1000 is equipped with a positive electrode 101, a first electrolyte layer 102, a second electrolyte layer 103, and a negative electrode 104 arranged in this order.

The first electrolyte layer 102 contains a first solid electrolyte material.

The second electrolyte layer 103 contains a second solid electrolyte material different from the first solid electrolyte material. The reduction potential of the second solid electrolyte material is lower than the reduction potential of the first solid electrolyte material.

The first solid electrolyte material is a material represented by chemical formula (1) below:

$$Li_\alpha M_\beta O_\gamma X_\delta \tag{1}$$

Here, $\alpha$, $\beta$, $\gamma$, and $\delta$ are all greater than 0. M is at least one element selected from the group consisting of metal elements other than Li, and metalloids. X is at least one element selected from the group consisting of Cl, Br, and I.

According to the aforementioned structure, the battery according to the first embodiment has a high discharge capacity.

Since the first solid electrolyte material has a high ion conductivity, a battery having high output characteristics can be realized. The first solid electrolyte material also has excellent thermal stability. Furthermore, since the first solid electrolyte material is sulfur-free, no toxic hydrogen sulfide is generated.

The first solid electrolyte material is one example of oxyhalide solid electrolytes. Other examples of the oxyhalide solid electrolytes are materials composed of Li, O, and X (X is at least one element selected from the group consisting of Cl, Br, and I); however, a first solid electrolyte material that contains M has higher ion conductivity. Thus, the battery exhibits high output characteristics by using the first solid electrolyte material.

In the present disclosure, "metalloids" mean B, Si, Ge, As, Sb, and Te.

In the present disclosure, the "metal elements" mean the following:
(i) All elements included in groups 1 to 12 in the periodic table (however, hydrogen is excluded) and
(ii) All elements included in groups 13 to 16 (however, B, Si, Ge, As, Sb, Te, C, N, P, O, S, and Se are excluded).

In order to improve the ion conductivity of the first solid electrolyte material, M may contain at least one element selected from the group consisting of Nb and Ta. Due to the improved ion conductivity, the battery has a high discharge capacity.

In order to improve the ion conductivity of the first solid electrolyte material, the following may be satisfied in chemical formula (1):

$$0.9 \leq \alpha \leq 1.2,$$

$$\beta = 1.0,$$

$$1.0 \leq \gamma \leq 1.3, \text{ and}$$

$$3.6 \leq \delta \leq 4.0.$$

Due to the improved ion conductivity, the battery has a high discharge capacity.

In order to improve the ion conductivity of the first solid electrolyte material, in chemical formula (1), the molar ratio of Li to M may be greater than or equal to 0.6 and smaller than or equal to 2.4, and the molar ratio of O to X may be greater than or equal to 0.16 and smaller than or equal to 0.35. Due to the improved ion conductivity, the battery has a high discharge capacity.

In order to improve the ion conductivity of the first solid electrolyte material, the first solid electrolyte material may be a material represented by chemical formula (A1) below:

$$Li_xMeO_yX_{(5+x-2y)} \tag{A1}$$

Me is at least one element selected from the group consisting of Nb and Ta. X is at least one element selected from the group consisting of Cl, Br, and I Furthermore, $0.1 \le x \le 7.0$ and $0.4 \le y \le 1.9$ are satisfied. Due to the improved ion conductivity, the battery has a high discharge capacity.

In order to improve the ion conductivity of the first solid electrolyte material, the first solid electrolyte material may be a material represented by chemical formula (A2) below:

$$Li_{2+b-3a}La_aOX_b \tag{A2}$$

Here, $1.0 \le a \le 2.0$ and $1.5 \le b \le 6.0$ are satisfied.

In order to improve the ion conductivity of the first solid electrolyte material, the first solid electrolyte material may be a material represented by chemical formula (A3) below:

$$Li_{2+b-3a}(SM_{1-x}A_x)_aOX_b \tag{A3}$$

Here, A is at least one element selected from the group consisting of Y, La, and Gd. Furthermore, $1.0 \le a \le 2.17$, $1.5 \le b \le 6.0$, and $0 \le x \le 0.5$ are satisfied.

In order for the battery according to the first embodiment to have excellent discharge characteristics, the discharge cut-off voltage of the battery may be greater than or equal to 2.9 V relative to lithium. In other words, in a method for controlling the battery according to the first embodiment (for example, a discharge method), the discharge cut-off voltage of the battery may be set to be greater than or equal to 2.9 V.

As a result of discharging, Li that has moved from the negative electrode to the positive electrode is inserted into the positive electrode active material along with the charge transfer reaction. At this stage, the solid electrolyte near the positive electrode active material occasionally undergoes reduction decomposition. Due to the electrical current generated by reduction decomposition, the apparent discharge capacity of the battery can increase. Whether reduction decomposition occurs or not can be determined from a voltage-capacity curve (for example, FIGS. 2 to 6).

As described above, by setting the discharge cut-off voltage of the battery according to the first embodiment to be greater than or equal to 2.9 V relative to lithium, the battery can operate without reduction decomposition of the first solid electrolyte material and the second solid electrolyte material. In other words, the battery exhibits excellent discharge characteristics.

The voltage at which the reduction decomposition of the solid electrolyte occurs (in other words, the lower end voltage of the potential window or the reduction potential) can be measured by a cyclic voltammetry method described in "Adv. Energy Mater. 2016, 20, 1501590-1501599".

The second solid electrolyte material may be a halide solid electrolyte (however, oxyhalide solid electrolytes are excluded).

The halide solid electrolyte has high ion conductivity and excellent thermal stability as with the first solid electrolyte material. Thus, a battery having high output characteristics and thermal stability can be realized due to the first solid electrolyte material contained in the first electrolyte layer 102 and the halide solid electrolyte (for example, a material represented by chemical formula (2) below) contained in the second electrolyte layer.

In order for the battery according to the first embodiment to have an excellent discharge capacity, the second solid electrolyte material may be a halide solid electrolyte represented by chemical formula (2) below:

$$Li_pM'_qX'_r \tag{2}$$

Here, p, a, and r are all greater than 0. M' is at least one element selected from the group consisting of metal elements other than Li, and metalloids. X' is at least one element selected from the group consisting of Cl, Br, and I.

In order to improve the ion conductivity of the second solid electrolyte material, M' in chemical formula (2) may contain Y (yttrium). Due to the improved ion conductivity, the battery has a high discharge capacity.

In order to improve the ion conductivity of the second solid electrolyte material, the second solid electrolyte material that contains Y may be a halide solid electrolyte represented by, for example, a chemical formula: $Li_aMe'_bY_cX'_6$. Here, $a+mb+3c=6$ and $c>0$ are satisfied. Me' is at least one element selected from the group consisting of metal elements other than Li and Y, and metalloids. X' is at least one element selected from the group consisting of Cl, Br, and I. Here, in represents the valence of Me'.

In order to improve the ion conductivity of the second solid electrolyte material, Me' may be at least one element selected from the group consisting of Mg, Ca, Sr, Ba, Zn, Sc, Al, Ga, Bi, Zr, Hf, Ti, Sn, Ta, and Nb.

In order to improve the ion conductivity of the second solid electrolyte material, the following may be satisfied in chemical formula (2):

$$2.7 \le p \le 3,$$

$$1 \le q \le 1.1, \text{ and}$$

$$r=6.$$

Due to the improved ion conductivity, the battery has a high discharge capacity.

In order to improve the ion conductivity of the second solid electrolyte material, the second solid electrolyte material may be a material represented by chemical formula (B1) below:

$$Li_{6-3d}Y_dX_6 \tag{B1}$$

Here, X is at least one element selected from the group consisting of Cl, Br, and I. Furthermore, $0<d<2$ is satisfied.

Due to the improved ion conductivity, the battery has a high discharge capacity.

In order to improve the ion conductivity of the second solid electrolyte material, the second solid electrolyte material may be a material represented by chemical formula (B2) below:

$$Li_{3-3\delta}Y_{1+\delta}Cl_6 \tag{B2}$$

Here, $0<\delta \le 0.15$ is satisfied.

Due to the improved ion conductivity, the battery has a high discharge capacity.

In order to improve the ion conductivity of the second solid electrolyte material, the second solid electrolyte material may be a material represented by chemical formula (B3) below:

$$Li_{3-\delta}Y_{1+\delta}Br_6 \tag{B3}$$

Here, $0<\delta \le 0.25$ is satisfied.

Due to the improved ion conductivity, the battery has a high discharge capacity.

In order to improve the ion conductivity of the second solid electrolyte material, the second solid electrolyte material may be a material represented by chemical formula (B4) below:

$$Li_{3-3\delta+a}Y_{1+\delta-a}Me_aCl_{6-x-y}Br_xI_y \qquad (B4)$$

Here, Me is at least one element selected from the group consisting of Mg, Ca, Sr, Ba, and Zn. Furthermore, the following is satisfied:

$-1<\delta<2$, $0<a<3$, $0<(3-3\delta+a)$, $0<(1+\delta-a)$, $0\leq x<6$, $0<y\leq 6$, and $(x+y)<6$.

Due to the improved ion conductivity, the battery has a high discharge capacity.

In order to improve the ion conductivity of the second solid electrolyte material, the second solid electrolyte material may be a material represented by chemical formula (B5) below:

$$Li_{3-3\delta}Y_{1+\delta-a}Me_aCl_{6-x-y}Br_xI_y \qquad (B5)$$

Here, Me is at least one element selected from the group consisting of Al, Sc, Ga, and Bi. Furthermore, the following is satisfied:

$-1<\delta<1$, $0<a<2$, $0<(1+\delta-a)$, $0\leq x<6$, $0<y\leq 6$, and $(x+y)<6$.

Due to the improved ion conductivity, the battery has a high discharge capacity.

In order to improve the ion conductivity of the second solid electrolyte material, the second solid electrolyte material may be a material represented by chemical formula (B6) below:

$$Li_{3-3\delta-a}Y_{1+\delta-a}Me_aCl_{6-x-y}Br_xI_y \qquad (B6)$$

Here, Me is at least one element selected from the group consisting of Zr, Hf, and Ti. Furthermore, the following is satisfied:

$-1<\delta<1$, $0<a<1.5$, $0<(3-3\delta-a)$, $0<(1+\delta-a)$, $0\leq x<6$, $0<y\leq 6$, and $(x+y)<6$.

Due to the improved ion conductivity, the battery has a high discharge capacity.

In order to improve the ion conductivity of the second solid electrolyte material, the second solid electrolyte material may be a material represented by chemical formula (B7) below:

$$Li_{3-3\delta-2a}Y_{1+\delta-a}Me_aCl_{6-x-y}Br_xI_y \qquad (B7)$$

Here, Me is at least one element selected from the group consisting of Ta and Nb. Furthermore, the following is satisfied:

$-1<\delta<1$, $0<a<1.2$, $0<(3-3\delta-2a)$, $0<(1+\delta a)$, $0\leq x<6$, $0<y\leq 6$, and $(x+y)<6$.

Due to the improved ion conductivity, the battery has a high discharge capacity.

As the second solid electrolyte material, for example, $Li_3YX_6$, $Li_2MgX_4$, $Li_2FeX_4$, $Li(Al, Ga, In)X_4$, or $Li_3(Al, Ga, In)X_6$ may be used. X is at least one element selected from the group consisting of Cl, Br, and I. "(Al, Ga, In)" means at least one element selected from the group consisting of Al, Ga, and In.

In order for the battery according to the first embodiment to have a high discharge capacity, the second solid electrolyte material may be a sulfide solid electrolyte.

An example of the sulfide solid electrolyte used as the second solid electrolyte material is $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$. Furthermore, LiX, $Li_2O$, MO, or $Li_pMO_q$ may be added. Here, M is at least one element selected from the group consisting of P, Si, Ge, B, Al, Ga, In, Fe, and Zn. Here, p and q are both a natural number. X is at least one element selected from the group consisting of F, Cl, Br, and I.

In order for the battery according to the first embodiment to have a high discharge capacity, the second solid electrolyte material may contain lithium sulfide and phosphorus sulfide. The second solid electrolyte material may be $Li_2S$—$P_2S_5$.

In order to increase the output of the battery while suppressing short circuiting between the positive electrode 101 and the negative electrode 104, the total thickness of the first electrolyte layer 102 and the second electrolyte layer 103 may be greater than or equal to 1 μm and smaller than or equal to 300 μm.

In order to increase the discharge capacity of the battery, the first electrolyte layer 102 may contain, for example, the first solid electrolyte material in an amount greater than or equal to 70 mass % or in an amount greater than or equal to 90 mass % relative to the first electrolyte layer 102. The first electrolyte layer 102 may be solely formed of the first solid electrolyte material.

In order to increase the discharge capacity of the battery, the second electrolyte layer 103 may contain, for example, the second solid electrolyte material in an amount greater than or equal to 70 mass % or in an amount greater than or equal to 90 mass % relative to the second electrolyte layer 103. The second electrolyte layer 103 may be solely formed of the second solid electrolyte material.

The positive electrode 101 contains a positive electrode active material and an electrolyte material.

The positive electrode active material is a material that can store and release metal ions (for example, lithium ions).

An example of the positive electrode active material is a lithium-containing transition metal oxide (for example, Li(NiCoAl)O$_2$, Li(NiCoMn)O$_2$, or LiCoO$_2$), a transition metal fluoride, a polyanion, a fluorinated polyanion material, a transition metal sulfide, a transition metal oxysulfide, or a transition metal oxynitride. In order to cut the production cost and increase the average discharge voltage of the battery, a lithium-containing transition metal oxide may be used as the positive electrode active material.

In order to increase the discharge capacity and the energy density of the battery according to the first embodiment, the positive electrode active material may be lithium nickel-cobalt-manganate. Lithium nickel-cobalt-manganate may be a compound represented by Li(NiCoMn)O$_2$.

The positive electrode active material may have a median diameter greater than or equal to 0.1 μm and smaller than or equal to 100 μm, When the positive electrode active material has a median diameter greater than or equal to 0.1 μm, the positive electrode active material and the electrolyte material can be dispersed satisfactorily in the positive electrode 101. As a result, the charge/discharge characteristics of the battery are improved. When the positive electrode active material has a median diameter smaller than or equal to 100 μm, the lithium diffusion speed in the positive electrode active material is improved. As a result, the battery can operate at high output.

The electrolyte material contained in the positive electrode 101 is, for example, a solid electrolyte.

The electrolyte material contained in the positive electrode 101 may be the first solid electrolyte material. In other words, the positive electrode 101 may contain the first solid electrolyte material.

The electrolyte material contained in the positive electrode 101 may be a material different from the first solid electrolyte material. Examples of such a material include a sulfide solid electrolyte, an oxide solid electrolyte, a polymer solid electrolyte, a complex hydride solid electrolyte, a halide solid electrolyte, and an oxyhalide solid electrolyte (for example, the first solid electrolyte material).

The electrolyte material contained in the positive electrode 101 may be a sulfide solid electrolyte.

An example of the sulfide solid electrolyte is Li$_2$S—P$_2$S$_5$, Li$_2$S—SiS$_2$, Li$_2$S—B$_2$S$_3$, Li$_2$S—GeS$_2$, Li$_{3.25}$Ge$_{0.25}$P$_{0.75}$S$_4$, or Li$_{10}$GeP$_2$S$_{12}$. To these, LiX, Li$_2$O, MO$_q$, or Li$_p$MO$_q$ may be added. Here, X is at least one element selected from the group consisting of F, Cl, Br and I. M is at least one element selected from the group consisting of P, Si, Ge, B, Al, Ga, In, Fe, and Zn. Furthermore, p and q are both a natural number.

The electrolyte material contained in the positive electrode 101 may be an oxide solid electrolyte.

Examples of the Oxide Solid Electrolyte Include
  (i) a NASICON type solid electrolyte such as LiTi$_2$(PO$_4$)$_3$ or an element-substituted form thereof,
  (ii) a perovskite type solid electrolyte based on (LaLi)TiO$_3$,
  (iii) a LISICON type solid electrolyte such as Li$_{14}$ZnGe$_4$O$_{16}$, Li$_4$SiO$_4$, LiGeO$_4$, or an element-substituted form thereof,
  (iv) a garnet type solid electrolyte such as Li$_7$La$_3$Zr$_2$O$_{12}$ or an element substituted form thereof,
  (v) Li$_3$PO$_4$ or a N-substituted form thereof, and
  (vi) a glass or glass ceramic obtained by adding Li$_2$SO$_4$ or Li$_2$CO$_3$ to a Li—B—O compound such as LiBO$_2$ or a Li$_3$BO$_3$.

The electrolyte material contained in the positive electrode 101 may be a polymer solid electrolyte.

Examples of the polymer solid electrolyte include polymer compounds and compounds of lithium salts. The polymer compound may have an ethylene oxide structure. The polymer compound having an ethylene oxide structure can further increase the ion conductivity since a larger amount of lithium salts can be contained.

An example of the lithium salt is LiPF$_6$, LiBF$_4$, LiSbF$_6$, LiAsF$_6$, LiSO$_3$CF$_3$, LiN(SO$_2$CF$_3$)$_2$, LiN(SO$_2$C$_2$F$_5$)$_2$, LiN(SO$_2$CF$_3$)(SO$_2$C$_4$F$_9$), or LiC(SO$_2$CF$_3$)$_3$. One lithium salt selected from these may be used alone. A mixture of two or more lithium salts selected from these may be used.

The electrolyte material contained in the positive electrode 101 may be a complex hydride solid electrolyte.

An example of the complex hydride solid electrolyte is LiBH$_4$—LiI or LiBH$_4$—P$_2$S$_5$.

The electrolyte material contained in the positive electrode 101 may be a halide solid electrolyte. Examples of the halide solid electrolyte are materials mentioned above as the examples of the second solid electrolyte material.

The electrolyte material contained in the positive electrode 101 may be an oxyhalide solid electrolyte other than the first solid electrolyte material. An example of the oxyhalide solid electrolyte is Li$_3$OX or Li$_2$HOX. Here, X is at least one element selected from the group consisting of Cl, Br and I.

The shape of the electrolyte material contained in the positive electrode 101 is not particularly limited. An example of the shape is a needle shape, a spherical shape, or an oval shape. For example, the shape of the electrolyte material may be granular.

When the shape of the electrolyte material contained in the positive electrode 101 is granular (for example, spherical), the median diameter of the electrolyte material may be smaller than or equal to 100 μm or smaller than or equal to 10 μm. In this manner, the positive electrode active material and the electrolyte material can be dispersed satisfactorily in the positive electrode 101. As a result, the charge/discharge characteristics of the battery are improved.

The electrolyte material contained in the positive electrode 101 may have a median diameter smaller than that of the positive electrode active material. In this manner, the electrolyte material and the positive electrode active material can be more satisfactorily dispersed in the positive electrode 101. As a result, the charge/discharge efficiency of the battery is improved.

In order to increase the energy density and the output of the battery, in the positive electrode 101, the ratio of the volume of the positive electrode active material to the total of the volume of the positive electrode active material and the volume of the electrolyte material may be greater than or equal to 0.3 and smaller than or equal to 0.95.

In order to increase the energy density and the output of the battery, the positive electrode 101 may have a thickness greater than or equal to 10 μm and smaller than or equal to 500 μm.

The negative electrode 104 contains a negative electrode active material and an electrolyte material.

The negative electrode active material is a material that can store and release metal ions (for example, lithium ions).

An example of the negative electrode active material is a metal material, a carbon material, an oxide, a nitride, a tin compound, or a silicon compound. The metal material may be a single metal or an alloy. An example of the metal material is lithium metal or lithium alloy. An example of the carbon material is natural graphite, coke, graphitizing carbon, carbon fibers, spherical carbon, artificial graphite, or amorphous carbon. In order to increase the capacity density, silicon (in other words, Si), tin (in other words, Sn), a silicon compound, or a tin compound may be used as the negative electrode active material.

The negative electrode active material may have a median diameter greater than or equal to 0.1 µm and smaller than or equal to 100 µm. When the negative electrode active material has a median diameter greater than or equal to 0.1 µm, the negative electrode active material and the electrolyte material can be dispersed satisfactorily in the negative electrode 104. As a result, the charge/discharge characteristics of the battery are improved. When the negative electrode active material has a median diameter smaller than or equal to 100 µm, the lithium diffusion speed in the negative electrode active material is improved. As a result, the battery can operate at high output.

The electrolyte material contained in the negative electrode 104 is, for example, a solid electrolyte.

The electrolyte material contained in the negative electrode 104 may be the same material as the second solid electrolyte material, In other words, the negative electrode 104 may contain the second solid electrolyte material.

The electrolyte material contained in the negative electrode 104 may be a material different from the second solid electrolyte material. An example of such a material is the sulfide solid electrolyte, the oxide solid electrolyte, the polymer solid electrolyte, the complex hydride solid electrolyte, or the halide solid electrolyte listed as the example of the electrolyte material contained in the positive electrode 101.

The shape of the electrolyte material contained in the negative electrode 104 is not particularly limited. An example of the shape is a needle shape, a spherical shape, or an oval shape. For example, the shape of the electrolyte material may be granular.

When the shape of the electrolyte material contained in the negative electrode 104 is granular (for example, spherical), the median diameter of the electrolyte material may be smaller than or equal to 100 µm or smaller than or equal to 10 µm. In this manner, the negative electrode active material and the electrolyte material can be dispersed satisfactorily in the negative electrode 104. As a result, the charge/discharge characteristics of the battery are improved.

The electrolyte material contained in the negative electrode 104 may have a median diameter smaller than that of the negative electrode active material. In this manner, the electrolyte material and the negative electrode active material can be satisfactorily dispersed in the negative electrode 104.

In order to increase the energy density and the output of the battery, in the negative electrode 104, the ratio of the volume of the negative electrode active material to the total of the volume of the negative electrode active material and the volume of the electrolyte material may be greater than or equal to 0.30 and smaller than or equal to 0.95.

In order to increase the energy density and the output of the battery, the negative electrode 104 may have a thickness greater than or equal to 10 µm and smaller than or equal to 500 µm.

In order to decrease the interface resistance, at least part of the surface of the positive electrode active material or at least part of the surface of the negative electrode active material may be covered with a coating material.

A material having low electron conductivity can be used as the coating material. An example of the coating material is the sulfide solid electrolyte, the polymer solid electrolyte, the complex hydride solid electrolyte, or the halide solid electrolyte listed as the example of the electrolyte material contained in the positive electrode 101. In order to increase the potential stability, an oxide solid electrolyte may be used as the coating material. Using an oxide solid electrolyte as the coating material can further improve the charge/discharge efficiency of the battery.

Examples of the oxide solid electrolyte used as the coating material are:

(i) Li—Nb—O compounds such as $LiNbO_3$,
(ii) Li—B—O compounds such as $LiBO_2$ or $Li_3BO_3$,
(iii) Li—Al—O compounds such as $LiAlO_2$,
(iv) Li—Si—O compounds such as $Li_4SiO_4$,
(v) Li—S—O compounds such as $Li_2SO_4$,
(vi) Li—Ti—O compounds such as $Li_4Ti_5O_{12}$,
(vii) Li—Zr—O compounds such as $Li_2ZrO_3$,
(viii) Li—Mo—O compounds such as $Li_2MoO_3$,
(ix) Li—V—O compounds such as $LiV_2O_5$, or
(x) Li—W—O compounds such as $Li_2WO_4$.

In order to increase the output of the battery, at least one selected from the group consisting of the first electrolyte layer 102 and the second electrolyte layer 103 may contain the sulfide solid electrolyte, the oxide solid electrolyte, the polymer solid electrolyte, or the complex hydride solid electrolyte listed as the example of the electrolyte material contained in the positive electrode 101.

At least one selected from the group consisting of the positive electrode 101, the first electrolyte layer 102, the second electrolyte layer 103, and the negative electrode 104 may contain a nonaqueous electrolyte solution, a gel electrolyte, or an ionic liquid in order to facilitate exchange of lithium ions and improve the output characteristics of the battery.

The nonaqueous electrolyte solution contains a nonaqueous solvent and a lithium salt dissolved in the nonaqueous solvent.

An example of the nonaqueous solvent is a cyclic carbonate solvent, a linear carbonate solvent, a cyclic ether solvent, a linear ether solvent, a cyclic ester solvent, a linear ester solvent, or a fluorine solvent. An example of the cyclic carbonate solvent is ethylene carbonate, propylene carbonate, or butylene carbonate. An example of the linear carbonate solvent is dimethyl carbonate, ethyl methyl carbonate, or diethyl carbonate. An example of the cyclic ether solvent is tetrahydrofuran, 1,4-dioxane, or 1,3-dioxolane. An example of the linear ether solvent is 1,2-dimethoxyethane or 1,2-diethoxyethane. An example of the cyclic ester solvent is γ-butyrolactone. An example of the linear ester solvent is methyl acetate. An example of the fluorine solvent is fluoroethylene carbonate, methyl fluoropropionate, fluorobenzene, fluoroethyl methyl carbonate, or fluorodimethylene carbonate. One nonaqueous solvent selected from these may be used alone, or a mixture of two or more nonaqueous solvents selected from these may be used.

An example of the lithium salt is $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. One lithium salt selected from these may be used alone, or a mixture of two or more lithium salts selected from these may be used. The lithium salt concentration is, for example, greater than or equal to 0.5 mol/L and smaller than or equal to 2 mon.

A polymer material impregnated with a nonaqueous electrolyte solution can be used as the gel electrolyte. An example of the polymer material is polyethylene oxide, polyacrylonitrile, polyvinylidene fluoride, polymethyl methacrylate, or a polymer having an ethylene oxide bond.

Examples of the cation contained in the ionic liquid are:
(i) aliphatic linear quaternary salts such as tetraalkyl ammonium or tetraalkyl phosphonium,
(ii) alicyclic ammonium such as pyrrolidiniums, morpholiniums, imidazoliniums, tetrahydropyrimidiniums, piperaziniums, or piperidiniums, or
(iii) nitrogen-containing heteroaromatic cations such as pyridiniums or imidazoliums.

An example of the anion contained in the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

At least one selected from the group consisting of the positive electrode 101, the first electrolyte layer 102, the second electrolyte layer 103, and the negative electrode 104 may contain a binder in order to improve adhesion between particles.

An example of the binder is polyvinylidene fluoride, polytetrafluoroethylene, polyethylene, polypropylene, aramid resin, polyamide, polyimide, polyamideimide, polyacrylonitrile, polyacrylic acid, methyl polyacrylate, ethyl polyacrylate, hexyl polyacrylate, polymethacrylic acid, methyl polymethacrylate, ethyl polymethacrylate, hexyl polymethacrylate, polyvinyl acetate, polyvinylpyrrolidone, polyether, polyether sulfone, hexafluoropolypropylene, styrene butadiene rubber, or carboxymethyl cellulose.

Copolymers can also be used as the binder. An example of such a binder is a copolymer obtained from two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more materials selected from the aforementioned materials may be used as the binder.

At least one selected from the group consisting of the positive electrode 101 and the negative electrode 104 may contain a conductive additive to increase the electron conductivity.

Examples of the Conductive Additive Are
(i) graphite such as natural graphite or artificial graphite,
(ii) carbon black such as acetylene black or Ketjen black,
(iii) conductive fibers such as carbon fibers or metal fibers,
(iv) fluorocarbon,
(v) metal powder such as aluminum,
(vi) conductive whiskers such as zinc oxide or potassium titanate,
(vii) conductive metal oxides such as titanium oxide, and
(viii) conductive polymer compounds such as polyaniline, polypyrrole, or polythiophene.

In order to cut the cost, (i) graphite or (ii) carbon black described above may be used An example of the shape of the battery according to the first embodiment is a coin type, a cylinder type, a prismatic type, a sheet type, a button type, a flat type, or a multilayer type.

Method for Producing First Solid Electrolyte Material

The first solid electrolyte material is, for example, produced by the following method.

Raw material powders of oxides, hydroxides, halides, or acid halides are prepared to obtain a target composition. For example, when preparing $LiNbOCl_4$, LiCl and $NbOCl_3$ are prepared such that the molar ratio thereof is 1:1.

Selecting the type of the raw material powders determines the elements represented by M and X in chemical formula (1). Adjusting the raw material powders, blend ratios, and synthetic processes determines the values of α, β, γ, and δ.

The raw material powders are mixed to obtain a mixed powder. The mixed powder is mechanochemically reacted with one another (in other words, through a mechanochemical milling process) in a mixing device such as a planetary ball mill to obtain a reaction product. The reaction product may be heat-treated in vacuum or an inert gas atmosphere (for example, an argon atmosphere or a nitrogen atmosphere). Alternatively, the mixture may be heat-treated in vacuum or an inert atmosphere to obtain a reaction product. Through these methods, the solid electrolyte material described above is obtained.

The composition of a solid electrolyte material can be determined by, for example, an analytical method such as an inductively coupled plasma emission analysis (in other words, ICP atomic emission spectroscopy), ion chromatography, inert gas fusion-infrared absorption spectrometry, or an electron probe microanalyzer (SPMA) method. However, since the measurement accuracy for the oxygen content is low, an error of about 10% can be included.

EXAMPLES

The present disclosure will now be described in further detail through examples.

Example 1

Preparation of First Solid Electrolyte Material

In a dry atmosphere having a dew point lower than or equal to −36° C. (hereinafter, this atmosphere is referred to as a "dry atmosphere"), raw material powders, LiCl and $NbOCl_3$, were prepared so that the molar ratio was LiCl:$NbOCl_3$=1:1. The resulting mixture was ground in a mortar to obtain a mixed powder. The obtained mixed powder was processed through a mechanochemical reaction in a planetary ball mill (type P-7, produced by Fritsch Japan Co., Ltd.) at 600 rpm for 24 hours. As a result, a powder of the first solid electrolyte material of Example 1 was obtained. The first solid electrolyte material of Example 1 had a composition represented by $LiNbOCl_4$.

Preparation of Second Solid Electrolyte Material

In a dry atmosphere, LiCl and $YCl_3$ were prepared as raw material powders so that the molar ratio was LiCl:$YCl_3$=3:1. A second solid electrolyte material of Example 1 was obtained as with the first solid electrolyte material of Example 1 except for the aforementioned matter. The second solid electrolyte material of Example 1 had a composition represented by $Li_3YCl_6$.

Measurement of Reduction Potential of Solid Electrolyte Materials

The reduction potential of the first solid electrolyte material of Example 1 was measured as follows.

In an insulating tube having an inner diameter of 9.5 mm, a SUS foil, a solid electrolyte material (100 mg), and a Li foil were stacked in this order to obtain a multilayer body. A pressure of 360 MPa was applied to the multilayer body. Next, current collectors formed of stainless steel were attached to the SUS foil and the Li foil, and current collecting leads were attached to the current collectors. Lastly, the interior of the insulating tube was blocked from the outside atmosphere and hermetically sealed by using an insulating ferrule. A potential measurement cell was obtained as such.

The potential measurement cell was placed in a 25° C. constant temperature oven. The potential was scanned at a sweeping rate of 5 mV/s by cyclic voltammetry measurement from −0.5 V until 6 V was reached on a Li-based potential.

The result found that the first solid electrolyte material of Example 1 had a reduction potential of 2.9 V.

The reduction potential of the second solid electrolyte material of Example 1 was measured in the same manner. The result found that the second solid electrolyte material of Example 1 had a reduction potential of 0.3 V.

Preparation of Positive Electrode Material

In a dry atmosphere, the first solid electrolyte material of Example 1 and $LiCoO_2$ (hereinafter referred to as "LCO") serving as a positive electrode active material were prepared so that the volume ratio was 30:70. These materials were mixed in an agate mortar. As a result, a positive electrode material of Example 1 was obtained.

Preparation of Secondary Battery

In an insulating tube having an inner diameter of 9.5 mm, the positive electrode material of Example 1 (10 mg), the first solid electrolyte material of Example 1 (80 mg), and the second solid electrolyte material of Example 1 (80 mg) were stacked in this order to obtain a multilayer body. A pressure of 360 MPa was applied to the multilayer body, and a positive electrode and solid electrolyte layers were formed.

Next, an aluminum powder (20 mg) was stacked on the positive electrode side. A pressure of 360 MPa was applied to the resulting multilayer body, and a positive electrode-side current collector was formed.

Next, a metallic In foil (thickness: 200 μm), a metallic Li foil (thickness: 300 μm), and a metallic In foil (thickness: 200 μm) were stacked on the solid electrolyte layer in this order to obtain a multilayer body. A pressure of 80 MPa was applied to the resulting multilayer body, and a negative electrode was formed.

Next, current collectors formed of stainless steel were disposed on the positive electrode and the negative electrode, and current collecting leads were attached to the current collectors.

Lastly, the interior of the insulating tube was blocked from the outside atmosphere and hermetically sealed by using an insulating ferrule. As a result, a secondary battery of Example 1 was obtained.

Example 2

Preparation of First Solid Electrolyte Material

In a dry atmosphere, LiCl and $NbOCl_3$ were prepared as raw material powders so that the molar ratio was LiCl:$NbOCl_3$=0.9:1.0. A powder of a first solid electrolyte material of Example 2 was obtained as with the first solid electrolyte material of Example 1 except for the aforementioned matter. The first solid electrolyte material of Example 2 had a composition represented by $Li_{0.9}NbOCl_{3.9}$.

The reduction potential of the first solid electrolyte material of Example 2 was measured as in Example 1. The result found that the reduction potential was 2.9 V.

Preparation of Positive Electrode Material

In a dry atmosphere, the first solid electrolyte material of Example 2 and LCO were prepared so that the volume ratio was 30:70. These materials were mixed in an agate mortar. As a result, a positive electrode material of Example 2 was obtained Preparation of Secondary Battery A secondary battery of Example 2 was obtained as with the secondary battery of Example 1 except that the first solid electrolyte material of Example 2 and the positive electrode material of Example 2 were used instead of the first solid electrolyte material of Example 1 and the positive electrode material of Example 1.

Example 3

Preparation of First Solid Electrolyte Material

In a dry atmosphere, $Li_2O_2$ and $TaCl_5$ were prepared as raw material powders so that the molar ratio was $Li_2O_2$:$TaCl_5$=1:2. The mixture of these powders was ground in a mortar. As a result, a mixed powder was obtained. The obtained mixed powder was processed through a mechanochemical reaction in the aforementioned planetary ball mill at 600 rpm for 24 hours. Next, the mixed powder was heat-treated at 200° C. for 6 hours. As a result, a powder of the first solid electrolyte material of Example 3 was obtained. The first solid electrolyte material of Example 3 had a composition represented by $Li_{1.2}TaO_{1.3}Cl_{3.6}$.

The reduction potential of the first solid electrolyte material of Example 3 was measured as in Example 1. The result found that the reduction potential was 2.3 V.

Preparation of Positive Electrode Material

In a dry atmosphere, the first solid electrolyte material of Example 3 and LCO were prepared so that the volume ratio was 30:70. These materials were mixed in an agate mortar. As a result, a positive electrode material of Example 3 was obtained.

Preparation of Secondary Battery

A secondary battery of Example 3 was obtained as with the secondary battery of Example 1 except that the first solid electrolyte material of Example 3 and the positive electrode material of Example 3 were used instead of the first solid electrolyte material of Example 1 and the positive electrode material of Example 1.

Example 4

Preparation of Second Solid Electrolyte Material

In an argon atmosphere having a dew point lower than or equal to −60° C., $Li_2S$ and $P_2S_5$ were prepared so that the molar ratio was $Li_2S$:$P_2S_5$=75:25. The resulting mixture was ground in a mortar to obtain a mixed powder. The obtained mixed powder was processed through a mechanochemical reaction in the aforementioned planetary ball mill at 510 rpm for 10 hours, and a glassy solid electrolyte was obtained as a result. This solid electrolyte was heat-treated in an inert atmosphere at 270° C. for 2 hours. As a result, a powder of the second solid electrolyte material of Example 4, which was a glass ceramic-like solid electrolyte, was obtained. The second solid electrolyte material of Example 4 had a composition represented by $Li_2S$—$P_2S_5$.

The second solid electrolyte material of Example 4 was stable relative to lithium.

Preparation of Secondary Battery

A secondary battery of Example 4 was obtained as with the secondary battery of Example 1 except that the first solid electrolyte material of Example 3, the second solid electrolyte material of Example 4, and the positive electrode material of Example 3 were used instead of the first solid electrolyte material of Example 1, the second solid electrolyte material of Example 1, and the positive electrode material of Example 1.

Comparative Example 1

Preparation of Secondary Battery

A secondary battery of Comparative Example 1 was obtained as with the secondary battery of Example 1 except that the first solid electrolyte material of Example 1 was used instead of the second solid electrolyte material of Example 1. In other words, the secondary battery of Comparative Example 1 did not contain the second solid electrolyte material.

Charge/Discharge Test

Each of the obtained secondary batteries was placed in a 25° C. constant temperature oven.

The secondary battery was charged until the potential reached 4.2 V relative to lithium at a current value of 60 μA which gave a 0.05 C rate (20 hour rate) relative to the theoretical capacity of the battery.

Next, the battery was discharged at a current value of 60 μA which also gave a 0.05 C rate.

The secondary batteries of Examples 1, 3, and 4 were discharged until the potential reached 2.5 V relative to lithium. In other words, the discharge cut-off voltage was 2.5 V.

The secondary batteries of Example 2 and Comparative Example 1 were discharged until the potential reached 2.9 V relative to lithium. In other words, the discharge cut-off voltage was 2.9 V.

The In—Li alloys used in the negative electrodes of the secondary batteries of Examples and Comparative Example had a potential of 0.6 V relative to lithium.

As a result of the charge/discharge test, the initial discharge capacity and the average discharge voltage of the batteries of Examples 1 to 4 and Comparative Example 1 were obtained. These values are indicated in Table.

TABLE

| | First solid electrolyte material | Second solid electrolyte material | Discharge cut-off voltage V | Initial discharge capacity mAh/g | Average discharge voltage V |
|---|---|---|---|---|---|
| Example 1 | $LiNbOCl_4$ | $Li_3YCl_6$ | 2.5 | 213 | 3.4 |
| Example 2 | $Li_{0.9}NbOCl_{3.9}$ | $Li_3YCl_6$ | 2.9 | 129 | 3.8 |
| Example 3 | $Li_{1.2}TaO_{1.3}Cl_{3.6}$ | $Li_3YCl_6$ | 2.5 | 126 | 3.7 |
| Example 4 | $Li_{1.2}TaO_{1.3}Cl_{3.6}$ | $Li_2S$—$P_2S_5$ | 2.5 | 127 | 3.7 |
| Comparative Example 1 | $LiNbOCl_4$ | None | 2.9 | 68 | 3.7 |

Discussions

As apparent from Table, the batteries of Examples 1 to 4 have high discharge capacity.

As apparent from the comparison between Example 1 and Comparative Example 1, when the first solid electrolyte material is directly in contact with the negative electrode, that is, when the battery does not have a second electrolyte layer, the discharge capacity of the battery decreases notably.

As apparent from the comparison between Example 1 and Example 2, the discharge average voltage of the battery improved by setting the discharge cut-off voltage of the battery to 2.9 V relative to lithium. This is presumably because setting the discharge cut-off voltage to be larger than or equal to 2.9 V relative to lithium suppresses reduction decomposition of the first solid electrolyte material.

As apparent from the comparison between Example 1 and Example 3, when the first solid electrolyte material contains Nb as the element M, the discharge capacity of the battery improves further.

As apparent from the comparison between Example 3 and Example 4, the battery has high discharge capacity irrespective of whether the second solid electrolyte material is a sulfide solid electrolyte or a halide solid electrolyte.

The battery of the present disclosure is used in all-solid lithium ion secondary batteries, for example.

What is claimed is:

1. A battery comprising:
a positive electrode, a first electrolyte layer, a second electrolyte layer, and a negative electrode arranged in this order,
wherein:
the first electrolyte layer contains a first solid electrolyte material,
the second electrolyte layer contains a second solid electrolyte material different from the first solid electrolyte material,
the first solid electrolyte material is represented by chemical formula (1) below:

$$Li_\alpha M_\beta O_\gamma X_\delta \quad (1)$$

where α, β, γ, and δ are all greater than 0,
M is at least one element selected from the group consisting of metal elements other than Li, and metalloids,
X is at least one element selected from the group consisting of Cl, Br, and I, and
a reduction potential of the second solid electrolyte material is lower than a reduction potential of the first solid electrolyte material.

2. The battery according to claim 1, wherein:
M contains at least one element selected from the group consisting of Nb and Ta.

3. The battery according to claim 1, wherein:
in chemical formula (1) described above,
$0.9 \leq \alpha \leq 1.2$,
$\beta = 1.0$,
$1.0 \leq \gamma \leq 1.3$, and
$3.6 \leq \delta \leq 4.0$ are satisfied.

4. The battery according to claim 1, wherein:
a discharge cut-off voltage is greater than or equal to 2.9 V relative to lithium.

5. The battery according to claim 1, wherein:
the second solid electrolyte material is represented by chemical formula (2) below:

$$Li_p M'_q X'_r \quad (2)$$

where p, q, and r are all greater than 0,
M' is at least one element selected from the group consisting of metal elements other than Li, and metalloids, and
X' is at least one element selected from the group consisting of Cl, Br, and I.

6. The battery according to claim 5, wherein:
M' contains yttrium.

7. The battery according to claim 5, wherein:
M' is yttrium, and
p=3, q=1, and r=6 are satisfied.

8. The battery according to claim 1, wherein:
the second solid electrolyte material is a sulfide solid electrolyte.

9. The battery according to claim 8, wherein:
the sulfide solid electrolyte contains lithium sulfide and phosphorus sulfide.

10. The battery according to claim 8, wherein:
the sulfide solid electrolyte is $Li_2S$—$P_2S_5$.

11. The battery according to claim 1, wherein:
the positive electrode contains the first solid electrolyte material.

* * * * *